Jan. 25, 1955  M. R. PEGUES  2,700,534
AUTOMATIC STIRRING DEVICE
Filed June 3, 1954
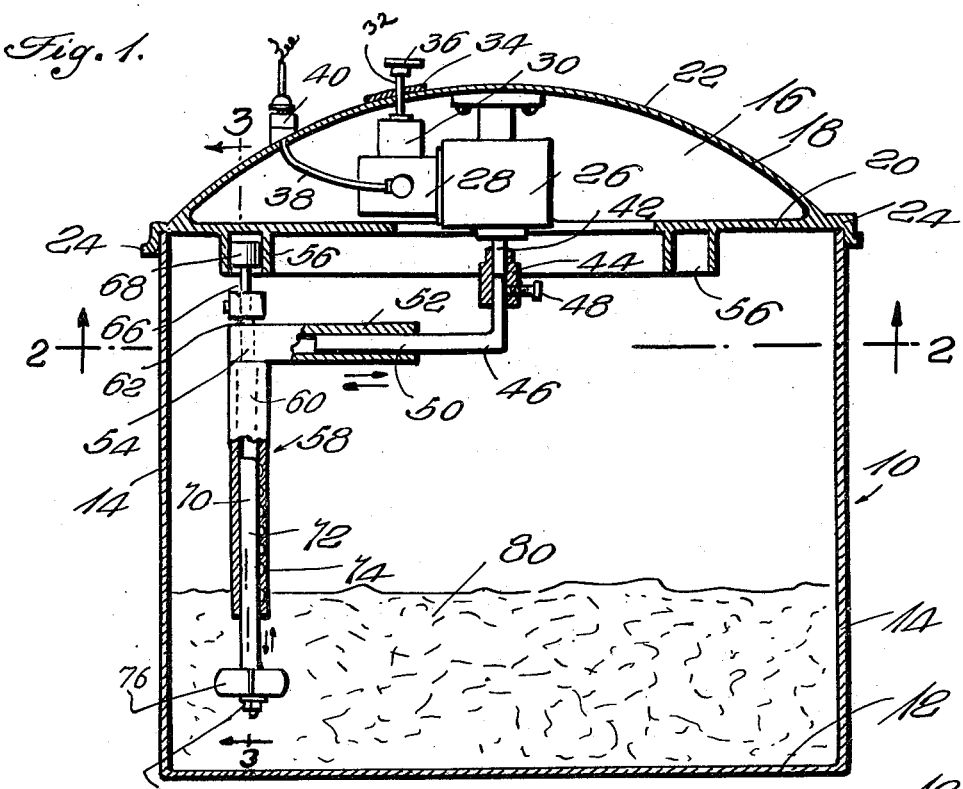
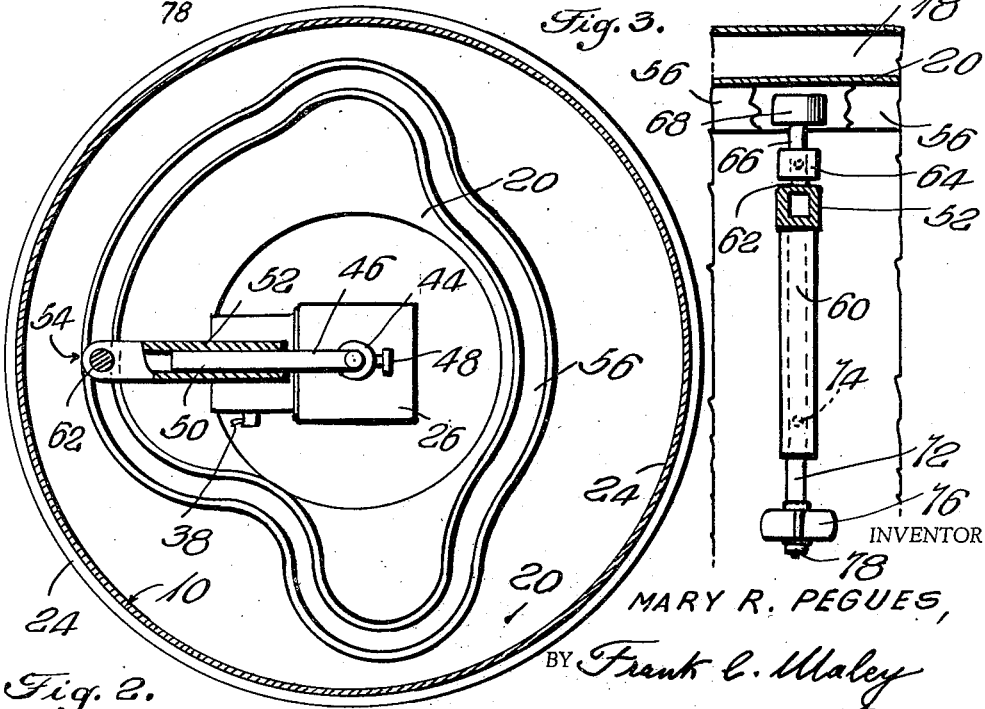
INVENTOR
MARY R. PEGUES,
BY Frank C. Maley
AGENT

United States Patent Office 2,700,534
Patented Jan. 25, 1955

2,700,534

AUTOMATIC STIRRING DEVICE

Mary R. Pegues, Jacksonville, Fla.

Application June 3, 1954, Serial No. 434,139

6 Claims. (Cl. 259—118)

This invention appertains to improvements in household electric kitchen appliances employed in the performance of kitchen tasks and particularly relates to an automatic stirring device for use in cooking foodstuffs.

In the cooking of many foodstuffs on a stove, it is necessary that the foodstuff be constantly stirred to prevent it from sticking to the pan, to properly blend foodstuffs together and to prevent some foodstuffs from boiling over. However, such manual stirring is tedious and requires a cook to stand in front of a stove subjected to the heat emanating from the burner under the pan. It necessitates that the cook give constant attention to the cooking foodstuff.

To avoid these discomforts and free the cook from constant vigilance of the cooking foodstuff is the primary object of this invention, which contemplates the provision of an automatic stirring device that is positionable on a pan in a manner to automatically stir the foodstuff in the pan.

Another object of this invention is to provide an automatic stirring device which can be attached to a pan and which includes a stirrer that is automatically moved bodily in a gyrational path in a pan and is rotated about its axis.

A further object of this invention is to provide an automatic stirring device which is powered by an electric motor mounted in a cover for a pan and controlled by a timer so that the stirring device will operate for any desired period without constant supervision.

A further object of this invention is to provide an automatic stirring device which is carried by a cover in a manner so that it is properly balanced on a pan and will not impart any tendency to the pan to tip over but, on the contrary, will balance the pan and prevent it from tipping over.

Another object of this invention is to provide a stirrer which depends from the underside of a cover and is revolved around a pan by an electric motor housed in the cover and is moved radially, as it is revolved, and is rotated about its own axis.

A further object of this invention is to provide means on the underside of the cover for moving the stirrer radially thereof responsive to the rotation thereof by an electric motor and to provide means for axially adjusting the stirrer so that it can be used with pans of various depths.

A further object of this invention is to provide an automatic stirring device which is carried by a cover and is adapted to be used with pans of various sizes.

These and ancillary objects and structural features of merit are attained by this invention, the preferred embodiment of which is set forth in the following description and illustrated in the accompanying drawing, wherein:

Fig. 1 is a vertical sectional view of a conventional pan with the automatic stirring device of this invention mounted thereon and shown partly in vertical section;

Fig. 2 is a cross-sectional view taken on line 2—2 of Fig. 1, and,

Fig. 3 is a detailed vertical section taken on line 3—3 of Fig. 1.

Referring now more particularly to the drawing, the numeral 10 designates a conventional pan having a bottom 12 and a side wall 14. The automatic stirring device 16 is adapted to be disposed over the open top of the pan in the form of a cover means. The device 16 includes a cover type housing 18 which includes a flat bottom wall 20 and a dome-shaped or convex top wall 22 which is spaced vertically from the bottom wall. The peripheral edges of the top and bottom walls are connected together and an angular flange 24 extends radially from such edges. The flange 24 is adapted to fit over the upper edge of the side wall 14 of the pan to locate the housing on the pan.

A gear reduction unit 26 is vertically mounted in the housing at the center thereof and a small electric motor 28 is housed in the housing and drivingly connected to the gear reduction unit 26. A timer 30 is attached to the motor and has a setting rod 32 which upstands therefrom and extends through an opening in the top wall 22. An indicia plate 34 is mounted on the outside of the top wall 22 and the rod 32 extends through the plate and has an operating knob 36 on its outer terminal. Conductors 38 extend from the motor to a toggle switch 40 which is mounted on the top wall 22 and from which conductors extend to be connected to a convenience outlet.

A drive shaft 42 depends from the gear reduction unit 26 and terminates in a socket 44 in which the upper end of a right angular rod 46 is fixed by a set screw 48. The horizontal section 50 of the rod extends radially from the center of the housing and is vertically spaced below the bottom wall 20 of the housing.

A sleeve 52 is freely slidable on the outer end of the section 50 and terminates in a horizontal collar 54 which has its bore disposed vertically.

A cam track 56 is provided on the underside of the bottom wall 20 and is disposed around the vertical section of the rod 46. The cam track 56 is composed of a number of sections of varying radii. A stirrer 58 is provided and includes a tubular, non-circular shaft 60 which has a coaxially reduced circular upper end 62. The end 62 is rotatably disposed in the collar 54 and is attached by a collar 64 to an axially aligned pin 66. The pin 66 carries a fixed roller 68 which is disposed in the cam track 56. The shaft 60 has vertically spaced recesses 70 and a complemental shaft 72 is axially slidable in the shaft 60. The shaft 72 has a spring pressed radial detent 74 which is adapted to seat in the recesses.

The shaft 72 carries a paddle element 76 which is attached to the lower threaded end of the shaft 72 by a nut 78.

In use, the housing is placed on top of the pan 10, after the foodstuff 80 is placed in the pan. The timer 30 is then set to the desired period of operation of the motor and the switch 40 is actuated to energize the motor. The drive shaft 42 then rotates the stirrer 58 and, as the rod 46 is rotated, the stirrer is moved in and out radially relative to the center of the housing. The stirrer is caused to move radially by the roller moving in the cam track and such movement is permitted by the sliding action of the sleeve on the horizontal section 50.

As the stirrer revolves around the pan, it thus moves in and out radially and does not move in a single circle. The roller 68 is frictionally received in the cam track 56 and, as it is moved along the cam track, it is caused to rotate, thereby producing an axial rotation of the stirrer.

Therefore, there is a compound movement of the stirrer, namely, the bodily revolution or gyration of the stirrer about the pan and the axial rotation of the stirrer. Such movement causes the foodstuff to be thoroughly blended and mixed.

The stirrer can be axially adjusted to accommodate the stirring device for use with pans of varying depths by moving the shaft 72 in the shaft 60 and locating it in its adjusted position by means of the detent 74.

While the best known form of this invention has been shown and described, such is merely by way of example since other forms of the invention may be realized as come within the scope of the invention as defined in the appended claims.

What is claimed is:

1. An automatic stirring device for stirring foodstuffs and the like in a pan comprising a housing adapted to fit on the top of a pan, a prime mover housed in the housing and including a drive shaft depending from the housing, a vertically disposed stirrer, means connecting the stirrer to the drive shaft in a manner so that it is bodily revolved thereby around the pan, and means carried by the stirrer and the underside of the housing for producing a set irregular circular bodily movement of the stirrer as it revolves and for rotating the stirrer about its axis as it revolves, said last means comprising a cam track on the underside of the housing and a cam follower carried by the upper end of the stirrer and disposed in the cam track.

2. An automatic stirring device for stirring foodstuffs and the like in a pan comprising a housing having a bottom wall and a vertically spaced top wall, said walls having connected peripheral edges and housing forming a cover for a pan, an electric motor mounted in the housing and including a drive shaft centrally depending from the bottom wall of the housing, a horizontal telescopically arranged shafting radially extending from the drive shaft, a collar horizontally provided on the outer end of such shafting, a stirrer rotatably disposed vertically in the collar, a cam track formed on the underside of the bottom wall of the cover and a roller fixed to the stirrer and disposed in the cam track.

3. An automatic stirring device as claimed in claim 2, wherein said shafting includes an inner section fixed to the drive shaft and an outer tubular section freely sleeved thereon.

4. An automatic stirring device as claimed in claim 2, wherein said stirrer is axially adjustable.

5. An automatic stirring device as claimed in claim 2, wherein said stirrer includes an upper shaft having the roller on its upper end and rotatably disposed in the collar and a lower shaft telescopically arranged therewith and a paddle element carried by the lower shaft.

6. An automatic stirring device as claimed in claim 2, wherein a timer is associated with the motor and is operably exteriorly of the top wall of the housing.

References Cited in the file of this patent

UNITED STATES PATENTS

| | | |
|---|---|---|
| 1,479,584 | Conklin | Jan. 1, 1924 |
| 1,612,281 | Goetz | Dec. 28, 1926 |
| 2,529,691 | Holstein et al. | Nov. 14, 1950 |

FOREIGN PATENTS

| | | |
|---|---|---|
| 45,777 | Switzerland | Mar. 19, 1909 |
| 47,951 | Switzerland | June 15, 1909 |